United States Patent [19]
Cooper

[11] Patent Number: 6,009,418
[45] Date of Patent: Dec. 28, 1999

[54] METHOD AND APPARATUS FOR NEURAL NETWORKING USING SEMANTIC ATTRACTOR ARCHITECTURE

[76] Inventor: David L. Cooper, 3634 W. Ox Rd., Fairfax, Va. 22033

[21] Appl. No.: 08/713,470

[22] Filed: Sep. 13, 1996

Related U.S. Application Data

[60] Provisional application No. 60/016,707, May 2, 1996.

[51] Int. Cl.$^6$ .............................. G06F 15/18; G06G 7/00
[52] U.S. Cl. ................................ 706/15; 706/16; 706/25; 706/26; 706/27
[58] Field of Search .................................. 395/21, 22, 23, 395/24; 706/15, 16, 25, 26, 27, 29, 31, 44

[56] References Cited

U.S. PATENT DOCUMENTS

| | | | |
|---|---|---|---|
| 4,591,980 | 5/1986 | Huberman et al. ................. | 395/800.16 |
| 5,091,864 | 2/1992 | Baji et al. ................................... | 706/42 |
| 5,151,969 | 9/1992 | Petsche ..................................... | 706/31 |
| 5,153,923 | 10/1992 | Matsuba et al. .......................... | 382/158 |
| 5,214,715 | 5/1993 | Carpenter et al. ....................... | 382/157 |
| 5,636,326 | 6/1997 | Stork et al. ............................... | 706/25 |

OTHER PUBLICATIONS

Hanson, Cowen, Giles, *Advances in Neural Information Processing Systems 5*, "Derivin Receptive Fields Using an Optimal Encoding Criterion," Ralph Linsker, pp. 953–960, 1993.

L. Zhang et al., "Generating and Coding of Fractal Graphs by Neural Network and Mathematical Morphology Methods," IEEE Transactions on Neural Networks, vol. 7, No. 2, pp. 400–407, Mar. 1996.

Siegel, Edward. "Bose Einstein Condensation of Light: Liquid Light Superfluidity Application to Neural–Networks Equivalence to Quantum–Statistics: Automatic Optimizing Optimization–Problems Optimally (OOPO)," 1994 Lasers and Electro–Optics Society Meeting, vol. 1, pp. 153–154.

*Primary Examiner*—Tariq R. Hafiz
*Assistant Examiner*—Jason W. Rhodes, Jr.
*Attorney, Agent, or Firm*—Richard E. Kurtz; Evan R. Smith; Greenberg Traurig

[57] ABSTRACT

A semantic attractor memory uses an evolving neural network architecture and learning rules derived from the study of human language acquisition and change to store, process and retrieve information. The architecture is based on multiple layer channels, with random connections from one layer to the next. One or more layers are devoted to processing input information. At least one processing layer is provided. One or more layers are devoted to processing outputs and feedback is provided from the outputs back to the processing layer or layers. Inputs from parallel channels are also provided to the one or more processing layers. With the exception of the feedback loop and central processing layers, the network is feedforward unless it is employed in a hybrid back-propagation configuration. The learning rules are based on non-stationary statistical processes, such as the Polya process or the processes leading to Bose-Einstein statistics, again derived from considerations of human language acquisition. The invention provides rapid, unsupervised processing of complex data sets, such as imagery or continuous human speech, and a means to capture successful processing or pattern classification constellations for implementation in other networks.

20 Claims, 9 Drawing Sheets

METHOD AND APPARATUS FOR NEURAL NETWORKING USING SEMANTIC ATTRACTOR ARCHITECTURE

This application claims the benefit of U.S. Provisional application Ser. No. 60/016,707 filed May 2, 1996.

BACKGROUND OF THE INVENTION

1. Field of the Invention

The invention relates in general to field of neural networks, and in particular to a neural network architecture and method which utilizes Bose-Einstein statistics or Polya modeling to capture a process.

2. Related Art

Neural networks have been known and used in the prior art in computer applications which require complex and/or extensive processing. Such applications include, e.g., pattern recognition and image and voice processing. In these applications, neural networks have been known to provide greatly increased processing power and speed over conventional computer architectures. Several approaches to neural networking exist and can be distinguished from one another by their different architectures. Specifically, the approaches of the prior art can be distinguished by the numbers of layers and the interconnections within and between them, the learning rules applied to each node in the network, and whether or not the architecture is capable of supervised or unsupervised learning.

A neural network is said to be "supervised" if it requires a formal training phase where output values are "clamped" to a training set. In other words, such networks require a "teacher," something not necessarily found in nature. Unsupervised networks are desireable precisely for this reason. They are capable of processing data without requiring a preset training set or discrete training phase. Biological neural networks are unsupervised, and any attempt to emulate them should aspire to this capability. Of the following approaches, the Boltzmann/Cauchy and Hidden Markov models are supervised networks and the remainder are unsupervised networks.

At least eight principal types of feedback systems, also called backpropagation models, have been identified in the prior art. The Additive Grossberg model uses one layer with lateral inhibitions. The learning rule is based on a sigmoid curve and updates using a steepest ascent calculation. The Shunting Grossberg is similar, with an added gain control feature to control learning rates. Adaptive Resonance Theory models use two layers, with on-center/off-surround lateral feedback and sigmoid learning curves. The Discrete Autocorrelator model uses a single layer, recurrent lateral feedback, and a step function learning curve. The Continuous Hopfield model uses a single layer, recurrent lateral feedback, and a sigmoid learning curve. Bi-Directional Associative Memory uses two layers, with each element in the first connected to each layer in the second, and a ramp learning curve. Adaptive Bi-Directional Associative Memory uses two layers, each element in the first connected to each in the second, and the Cohen-Grossberg memory function. This also exists in a competitive version. Finally, the Temporal Associative Memory uses two layers, with each element in the first connected to each element in the second, and an exponential step learning function.

At least eight principal types of feedforward systems have been identified. The Learning Matrix uses two layers, with each element in the first connected to each element in the second, and a modified step learning function. Drive-Reinforcement uses two layers, with each element in the first connected to each in the second, and a ramp learning function. The Sparse Distributed Memory model uses three layers, with random connections from the first to the second layer, and a step learning function. Linear Associative Memory models use two layers, with each element in the first layer connected to each element in the second, and a matrix outer product to calculate learning updates. The Optimal Linear Associative Memory model uses a single layer, with each element connected to each of the others, and a matrix pseudo-inverse learning function. Fuzzy Associative Memory uses two layers, with each element in the first connected to each element in the second, and a step learning function. This particular model can only store one pair of correlates at a time. The Learning Vector Quantizer uses two layers, with each element in the first connected to each in the second, negative lateral connections from each element in the second layer with all the others in the second layer, and positive feedback from each second layer element to itself. This model uses a modified step learning curve, which varies as the inverse of time. The Counterpropagation model uses three layers, with each element in the first connected to each in the second, each element in the second connected to each in the third, and negative lateral connections from each element in the second layer to each of the rest, with positive feedback from each element in the second layer to itself. This also uses a learning curve varying inversely with time.

Boltzmann/Cauchy models use random distributions for the learning curve. The use of random distributions to affect learning is advantageous because use of the distributions permits emulation of complex statistical ensembles. Thus, imposing the distributions imposes behavioral characteristics which arise from complex systems the model networks are intended to emulate. However, the Botzmann/Cauchy networks are capable only of supervised learning. And, these models have proven to be undesirably slow in many applications.

Hidden Markov models rely on a hybrid architecture, generally of feedforward elements and a recurrent network sub-component, all in parallel. These typically have three layers, but certain embodiments have had as many as five. A fairly typical example employs three layers, a softmax leaning rule (i.e., the Boltzmann distribution) and a gradient descent algorithm. Other examples use a three-layer hybrid architecture and a gamma memory function, rather than the usual mixed Gaussian. The gamma distribution is convenient in Bayesian analysis, also common to neural network research, and is the continuous version of the negative-binomial distribution. However, the underlying process for this model is a stationary one. That is, the probability distribution is the same at time $t$ and time $t+\Delta t$ for all $\Delta t$.

Studies of language change and studies of visual and acoustic processing in mammals have been used in the prior art to identify the mechanisms of neural processing for purposes of creating neural network architectures. For example, it has been noted that mammalian visual processing seems to be accomplished by feed-forward mechanisms which amplify successes. Such processing has been modeled by calculating Gaussian expectations and by using measures of mutual information in noisy networks. It has further been noted that such models provide self-organizing feature-detectors.

Similarly, it has been noted in the prior art that acoustic processing in mammals, particularly bats, proceeds in parallel columns of neurons, where feed-forward mechanisms and the separation and convergence of the signal produce sophisticated, topically organized feature detectors.

SUMMARY OF THE INVENTION

The semantic attractor memory of the invention according to a preferred embodiment uses a neural network architecture and learning rules derived from the study of human language acquisition and change to store, process and retrieve information. The invention provides rapid, unsupervised processing of complex data sets, such as imagery or continuous human speech.

The semantic attractor memory according to a preferred embodiment of the invention is motivated by considerations from human language acquisition and change, as well as the general constraints posed by the structure of the human perceptive apparatus and systems for muscle control. It is based on multiple layer channels, with random connections from one layer to the next; several layers devoted to processing input information; at least one processing layer; several layers devoted to processing outputs; feedback from the outputs back to the processing layer; and inputs from parallel channels, also to the processing layer. With the exception of the feedback loop and central processing layers, the network is feedforward. The learning rules are preferably based on Bose-Einstein statistics, again derived from considerations of human language acquisition.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION OF THE DRAWINGS

Figure 1:
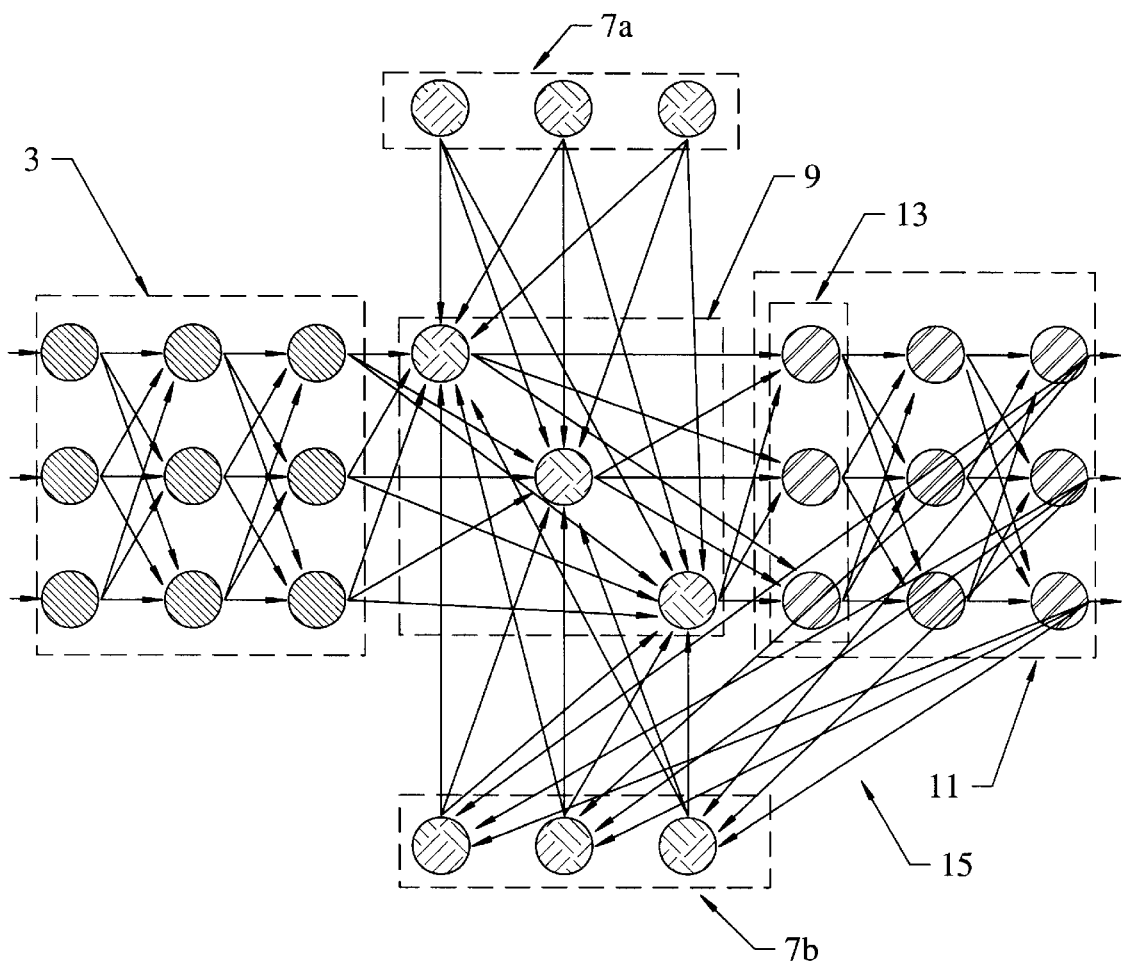
FIG. 1 illustrates a diagramatic view of the semantic attractor memory architecture of the invention according to a preferred embodiment.

By studying language acquisition and evolution, one can identify learning curves in language acquisition. These leaning curves can be characterized by negative-binomial statistics. One can also identify patterns of change which can be explained by underlying attractors with fractal dimension. That is, the dimension of the sets is not the topological dimension −1 for a line, 2 for a plane, etc.—but a related measure of the size and complexity of the set, whose measure can be fractional.

The measures of these attractors are consistent with Cantor sets in three dimensions. In Cooper, "*Linguistic Attractors: The Cognitive Dynamics of Language Acquisition and Change,*" chapters 1–3, which is incorporated by reference herein, it is demonstrated that Cantor sets are sufficient (though not necessary) to establish a universal Turing machine. That is, they are sufficient to demonstrate an ability to compute any function. This reference also shows a correlate of these attractors with statistical patterns derived from children learning English, which provided the evidence for a learning process which converges on a negative-binomial distribution.

The semantic attractor memory of the invention is motivated by the above and other considerations from human language acquisition and change, as well as by the general constraints posed by the structure of the human perceptive apparatus and systems for muscle control. It is based on multiple layer channels, with random connections from one layer to the next; several layers devoted to processing input information; at least one processing layer; several layers devoted to processing outputs; feedback from the outputs back to the processing layer; and inputs from parallel channels, also to the processing layer. With the exception of the feedback loop and central processing layers, the network is feedforward. The learning rules are based on Bose-Einstein statistics, again derived from considerations of human language acquisition.

The semantic attractor memory of the invention according to a preferred embodiment is derived from a model of human speech acquisition based on random pattern matching. The requirement for negative reinforcement in human speech acquisition is controversial, but the consensus view seems to be that it is not required. A stochastic process relying on positive reinforcement which also yields the leaning curves observed in human subjects as they learn to speak is consequently preferred for the matching process. Bose-Einstein statistics capture such a process, which can also be modeled as a Polya process that models sampling with replacement from sample populations. This process will also lead to a fractal pattern of synapse sequences corresponding to each learned pattern. Such a pattern is also to be expected from data on human language change.

In the limit, Bose-Einstein systems or Polya processes converge to learning curves with negative-binomial distributions, but the fundamental process is a non-stationary one. As a further consequence, any model which relies on stationary processes (i.e., any Markov process, normal processes, Bernoulli processes, gamma processes, etc.) is only an approximation to this model, and accurate only in the limit as nodes approach infinity.

The architecture of the Semantic Attractor Memory at once mimics the input and output processing found in human perceptions and muscle control, and permits a variant of recurrent network architectures to learn in an unsupervised environment. Parallel "leaky" channels combine the strengths of Markov or other hybrid architectures with a more structured higher scale architecture. That is, major formations in the human brain most probably are joined on a large scale by pattern instructions, but internally by random connections. The multiple layers within a channel reflect the fact that the human nervous system does considerable processing before information is presented to the brain, and, again, considerable processing after leaving the brain before impulses arrive at the muscles. This not only contributes a time delay before feedback but also additional content to the commands to the muscles—commands which must have been learned.

FIG. 1 illustrates a diagramatic view of the semantic attractor memory architecture of the invention according to a preferred embodiment. The diagram depicts typical elements in the network, but each layer in a channel will have many more than three elements per layer. These will be connected randomly to elements in the next layer, so it is not necessarily the case that each element in one layer is connected to each in the next. More than three layers may be necessary before arrival at the processing level, and more than three layers may be necessary before reaching the implementation layer (e.g., muscles).

In FIG. 1, information arrives from the left to a perceptual apparatus, which is a layer within input processing layers 3. The preceptual apparatus encodes the data, and passes it to the next layer. This flow continues to the processing layer 9, where inputs converge with inputs from parallel channels 7a, 7b, and output from a feedback loop 15 connected to the primary channel 3, 9, 11.

The architecture uses feedforward nodes, randomly linked to higher levels within prescribed channels to process the inputs. Although not depicted, connections from each layer to the next are random: each node is not necessarily connected to each one in the layer above it. There is at least one central layer 9 with lateral connections to other channels 7a, 7b. This will be called the lateral processing layer.

Outputs proceed to the right, again with random feedforward connections. Feedback from the output channels 11 are merged with inputs to the lateral processing layer. This feedback is also merged with feedback from the lateral processing layer and from the initial output layer 13. This feedback is not depicted in FIG. 1, but is depicted by rings in FIGS. 2 and 3, discussed below. Outputs from other channels are also presented to the lateral processing layer.

Central processing is actually embedded between input and output channels, so that there is no discrete transition. A side view of a single channel is at FIG. 2, and details of internal feedback in the central processing layers is at FIG. 3. The rationale for these feedback and processing arrangements is set forth in the discussion of the learning rule for the network below.

The FIGS. depict a seven-layer architecture, but the actual number of layers would be dependent on input pre-processing, and output processing. This could require as few as one input layer or more than three feed-forward input layers, as well as at least one and possibly more than three feed-forward output layers in their respective channels. The essential result is, however, that structured data is presented to the central processing layers from input channels, and that outputs are further processed as required for final implementation. In natural language, for example, this would mean the network would take acoustic inputs, encode them in the input channels, process them in the central processing layers, and then process out-going motor signals in the necessary channels to a number of different muscle groups.

The three-layer central processing core of the architecture will produce the necessary computational characteristics.

Figure 2:
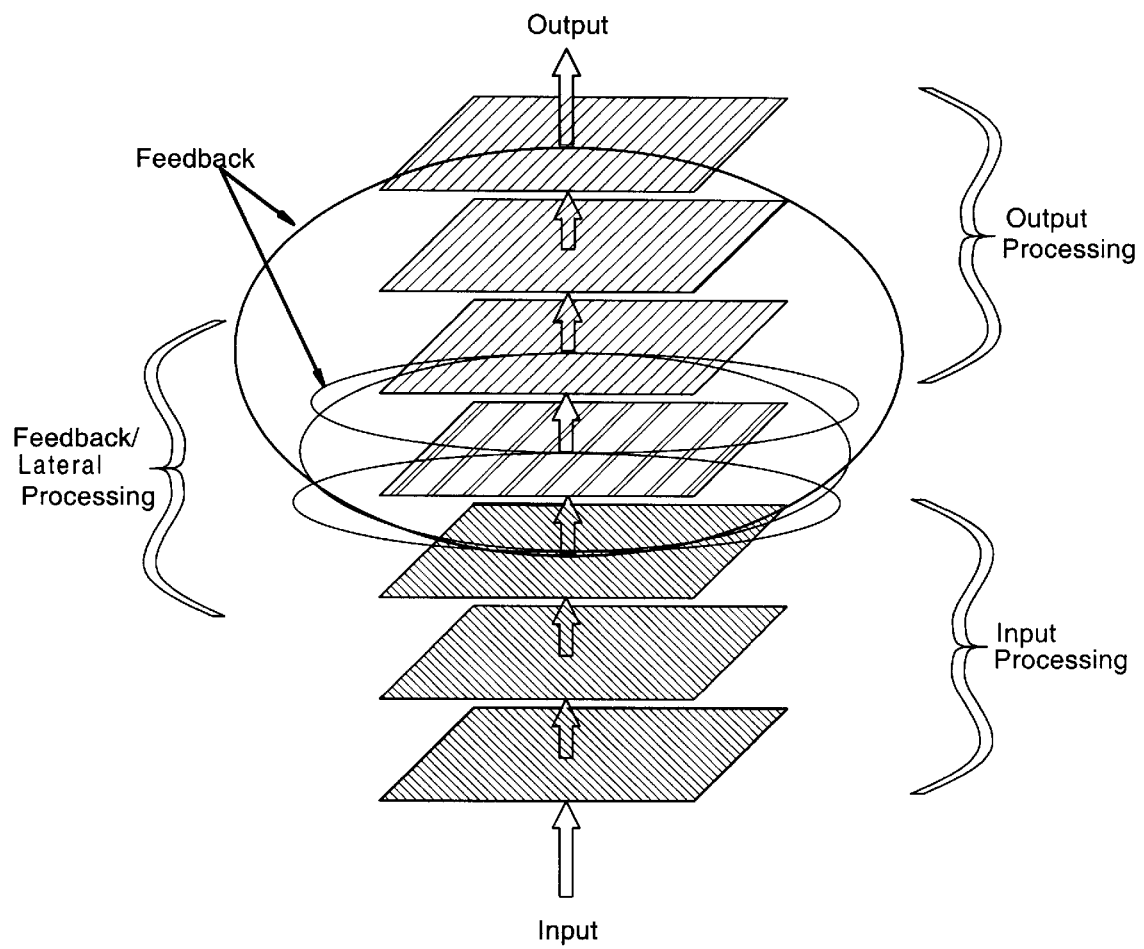
FIG. 2 illustrates a side view of a single channel.

It should be noted that in FIG. 2 the final input layer is also the first central processing layer. Similarly, the final processing layer is the initial feed-forward layer to output channels.

Figure 3:
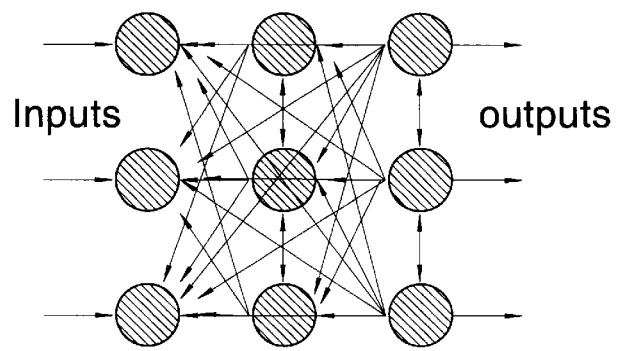
FIG. 3 illustrates details of internal feedback in central processing layers.

FIG. 3 shows the internal feedback within the central processing layers. External feedback from the beginning and the end of the output channels is merged with the inputs at the initial central processing/final input layer. Other channels feed into the lateral processing layer. Lateral connections in the central layer are crucial to a multi-channel architecture. An additional layer with lateral connections is optional, but makes processing of sequences easier for the network. Consequently, for language processing, where sequences must be processed with minimal load on memory, the additional lateral connections may be necessary.

Figure 4:
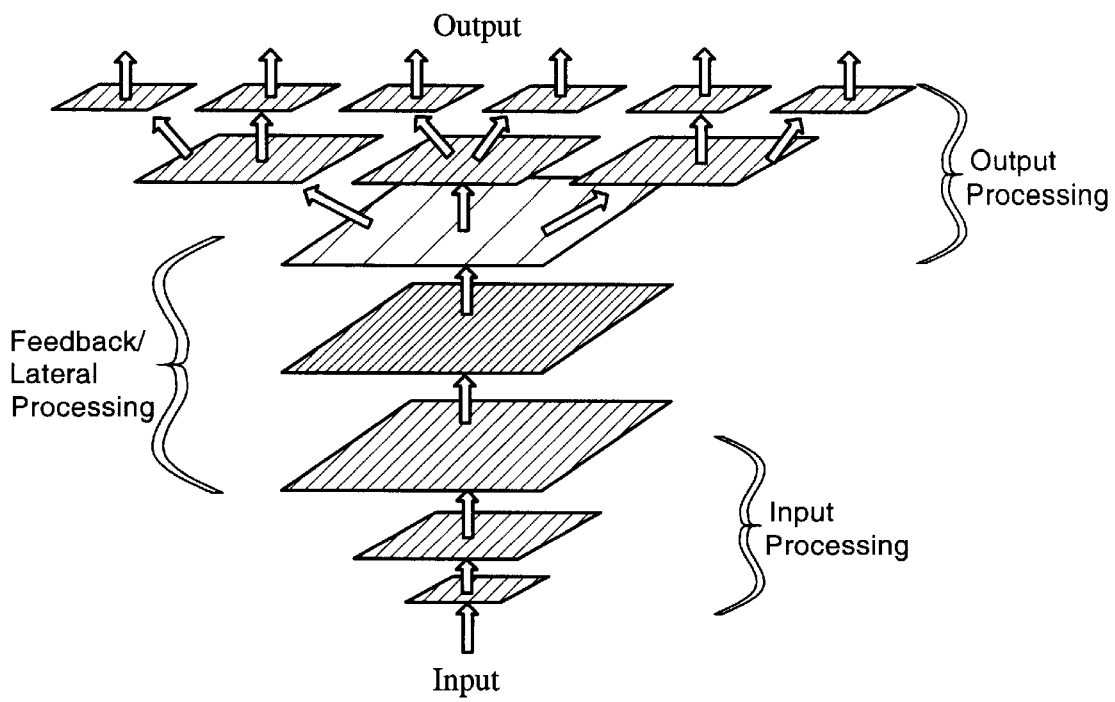
FIG. 4 illustrates the effect of "leaky" processing.

In a complex organism, channels would be linked to specific perceptual organs and to output musculature keyed to specific behavior. Success is reinforced. This is a mild form of a competitive network, so that information will be organized topologically when processed, but the topology will not be strict. The random connections will make the upward flow of information within the channel "leaky." The effect of "leaky" processing is diagrammed in FIG. 4.

Figure 5:
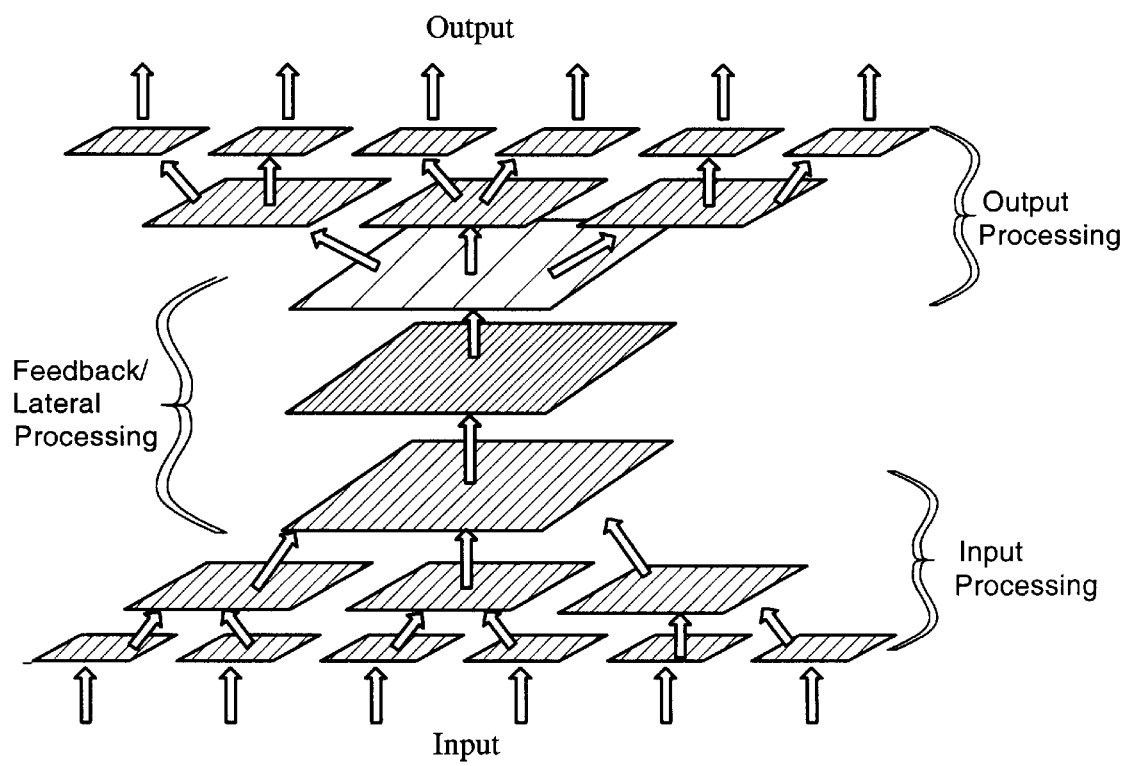
FIG. 5 shows multiple "leaky" inputs merging at the central processing layers, and outputs proceeding to different implementation channels.

FIG. 5 shows multiple "leaky" inputs merging at the central processing layers, and outputs proceeding to different implementation channels. Processing in the central layers would be affected by the structure of lateral channels as well. These can be designed into the architecture, or evolve through the same rules as apply to the vertical channels.

Feedback can be processed by any of several expectation maximization schemes. Such schemes are described, e.g., in Linsker, "*Neural Information Processing Systems 5*" Morgan Kaufmann Publishers, 1993, pages 953–960, the disclosure of which is incorporated herein by reference. However, any reinforcement over the critical threshold must update the successful interconnections according to Bose-Einstein statistics (originally, equiprobability assigned to different constellations of indistinguishable particles). This can be done as follows.

Begin with a Polya urn scheme, with $m_O$ balls in the urn, m black and $m_O-m$ red. For each drawing, replace each black ball with two black balls, and each red ball with two red balls (sampling with replacement). Then for $n_O$ drawings, of which n balls were black, and $n_O-n$ were red, we have the Polya distribution for the probability that the next ball will be black $$f_P(n) = \frac{\binom{m+n-1}{n}\binom{m_0-m+n_0-n-1}{n_0-n}}{\binom{m_0+n_0-1}{n_0}}$$

This is also the Bose-Einstein distribution for $m_O$ cells (neurons/synapses) and $n_O$ particles (inputs), with a constellation of m cells (neurons/synapses) with a total of n indistinguishable particles (successes). A constellation of m cells with a total of n indistinguishable balls for $n_O \rightarrow \infty$, $m_O \rightarrow \infty$, such that $n_O/m_O = p$, p finite is then $$f_{B-E}(m,n) = f_P(n) \rightarrow \binom{m+n-1}{n}\frac{p_n}{(1+p)^{m+n}}$$

This is a special case of the negative-binomial distribution, as required from learning curve data on human speech acquisition.

The network requirement is then $n_O$ reinforced pathways across $m_O$ synapses, both large, with $n_O/m_O = p$. When the Polya process has the substitution factor $c \geq 0$, the transition probability from $E_n$ (n black) to $E_{n+1}$ (n+1 black) is $$\frac{m+nc}{m_0+n_0c} = \frac{r+n\gamma}{1+n_0\gamma} \text{ for } r = \frac{m}{m_0}; \gamma = \frac{c}{m_0}$$

This leads to a special form for a rule to update synaptic weights. In general, Hebbian learning rules are expressed in the form $$\Delta w_{kj}(n) = F(y_k(n), x_j(n))$$

for synaptic weights from j to k, where F is a function of pre- and post-synaptic activity. Frequently, models use the following special case $$\Delta w_{kj}(n) = \eta y_k(n) x_j(n)$$

where η is a positive learning rate parameter. To avoid saturation of the weights, this is often modified by the addition of a forgetting factor:

$$\Delta w_{kj}(n) = \eta y_k(n) x_j(n) - \alpha y_k(n) w_{kj}(n)$$

The rule has also been expressed in terms of the covariance between pre- and post-synaptic activities:

$$\Delta w_k(n) = \eta E[(y_k(n) - \bar{y}_k)(x_j(n) - \bar{x}_j)]$$

where E is the expectation for the activity.

The update rule for the semantic attractor memory uses the learning rate parameter in a very different way. The form of the rule with a decay rate (to avoid saturation of the weights) is $$\Delta w_{kj}(n) = \left(\frac{r \pm \eta}{s + \eta + \delta(t)}\right) y_k(n) x_j(n)$$

η positive; $\delta(t) \geq 0$ and monotone increasing
where r/s is the synaptic weight at epoch n−1, and $[r/s] \leq 1$. Here r is increased for excitation, and decreased for inhibition. It only changes when there is activity at the synapse. The decay rate δ(t) varies with time, and does not depend on synaptic activity. The cumulative update across all inputs j would then take the form $$\left(\frac{r + \alpha(n) - \beta(n)}{s + \eta(n) + \delta(t)}\right)$$

where $\alpha(n) + \beta(n) = \eta(n)$, all positive
where α(n) and β(n) count the numbers of excitatory and inhibitory inputs, respectively.

We can apply the Cohen-Grossberg theorem to this rule immediately to demonstrate that the Semantic Attractor Memory rule is capable of content-addressable memory. That is, any input of a portion of the memory can function to recall the rest. Briefly, the theorem states that for the class of neural networks described by the following system of coupled nonlinear differential equations:

$$\frac{d}{dt} u_j = a_j(u_j) \left[ b_j(u_j) - \sum_{i=1}^{N} c_{ji} \phi_i(u_i) \right], \quad j = 1, \ldots, N \quad (1)$$

the class of neural networks admits a Liapunov function, defined as $$E = \frac{1}{2} \sum_{i=1}^{N} \sum_{j=1}^{N} c_{ji} \phi_i(u_i) \phi_j(u_j) - \sum_{j=1}^{N} \int_0^{u_j} b_j(\lambda) \phi'_j(\lambda) d\lambda \quad (2)$$

where $$\phi'(\lambda) = \frac{d}{d\lambda}(\phi_j(\lambda))$$

When the synaptic weights of the network are "symmetric":

$$c_{ij} = c_{ji}$$

the function $a_j(u_j)$ satisfies the condition for "nonnegativity":

$$a_j(u_j) \geq 0$$

and the nonlinear input-output function $\phi_j(u_j)$ satisfies the condition for "monotonicity":

$$\frac{dE}{dt} \leq 0 \text{ for } u_j \neq 0 \text{ and all } j$$

then the Liapunov function E of the system defined by Eq. (2) satisfies the condition and the system is globally asymptotically stable. That is, the system will be capable of content addressable memory.

Applying the Cohen-Grossberg theorem to the Semantic Attractor Memory, we note immediately that pre- and post-synaptic weights are identical, and thus use symmetric weights between nodes. Then, if we set $\alpha_j(u)_j = 1$, it remains to show that the function $\phi'(u_j) \geq 0$. This is the case for $\alpha(n) \geq \beta(n)$ and δ(t) sufficiently small. Thus, we have monotonicity, and the semantic attractor memory is capable of content addressable memory. It is also capable of the other attributes necessary for computation.

The learning rule for the Semantic Attractor Memory naturally leads to negative-binomial learning curves for the network—comparable to curves observed in humans acquiring natural language. This is an emergent property of the rule and need not be imposed by a structured learning regime as in the Boltzmann and Cauchy networks. The rule will lead to clusters of nodes in each layer associated with each successful multi-channel pattern. This is an important characteristic which will permit the network to function as a Turing machine. This can be demonstrated by considering these clusters of favored nodes as attractors. Their measurement is consistent with natural language in humans, and indicative of structured sets capable of computation. For example, the most useful measure we can apply to phonological attractors is Hausdorff dimension, which permits us to classify them as fractal sets. To make this application, we must establish a measure over our phase space. This is simple enough for formant frequencies, and can be extended to axes that code for other relevant factors, such as source, city, generation, gender, and conditioning environment. Using the usual Euclidean metric, we can establish a "distance" and can measure a "diameter." Then, we can say the following.

The diameter of a set U is $|U| = \sup\{|x-y| : x, y \in U\}$. For $E \subset \cup U_i$ and $0 < |U_i| \leq \delta$ for each I, $\{U_i\}$ is a δ-cover of E. For $\delta > 0$, $s \geq 0$, $$H_\delta^s(E) = \inf \sum_{i=1}^{\infty} |U_i|^s$$

where the infimum is over all countable δ-covers $\{U_i\}$ of E. $H_\delta^s$ is an outer measure on semantic space. The Hausdorff s-dimensional outer measure of E is $$H^s(E) = \lim_{\delta \to 0} H^s_\delta(E) = \sup_{\delta \to 0} H^s_\delta(E)$$

This limit may be infinite, since $H^s_\delta$ increases as $\delta$ decreases. $H^s(E)$ is a metric outer measure since it satisfies a triangle inequality. The restriction of $H^s$ to the $\sigma$-field of $H^s$-measurable sets is called Hausdorff s-dimensional measure.

For any E, $H^s(E)$ is non-increasing as s increases from 0 to $\infty$. For s<t, $$H^s_\delta(E) \geq \delta^{s-t} H^t_\delta(E)$$

This implies that if $H^t(E)$ is positive, $H^s(E)$ is infinite, which further implies that there is a unique value, dim E, called the Hausdorff dimension of E, such that $$H^s(E)=\infty \text{ if } 0 \leq s \leq \dim E; \; H^s(E)=0 \text{ if } \dim E < s < \infty$$

Ascribing probabilities to phonological attractors is therefore meaningful. We can ascribe fractal dimension to them as well.

Unfortunately, direct calculation of the Hausdorff dimension is often intractable. It can be approximated with another function, called the correlation function C(r), for varying distances r, which is given by $$C(r) = \frac{1}{N^2} \sum_{i,j} \theta(r - |X_i - X_j|)$$

Where N is the number of data points, r is the distance used to probe the structure of the attractor, $X_i$ and $X_j$ are pairs of points, and $\theta$ is the Heaviside function, where $\theta(x)=1$ for x>0 and $\theta(x)=0$ otherwise.

We estimate the dimension of the attractor by taking the slope of the linear portions of the curves. Since generally lnC(r)~dln(r), the slope will converge to d when the space is saturated. That is, the minimum number of variables to describe the manifold in n-space occupied by an attractor will be d.

Figure 6:
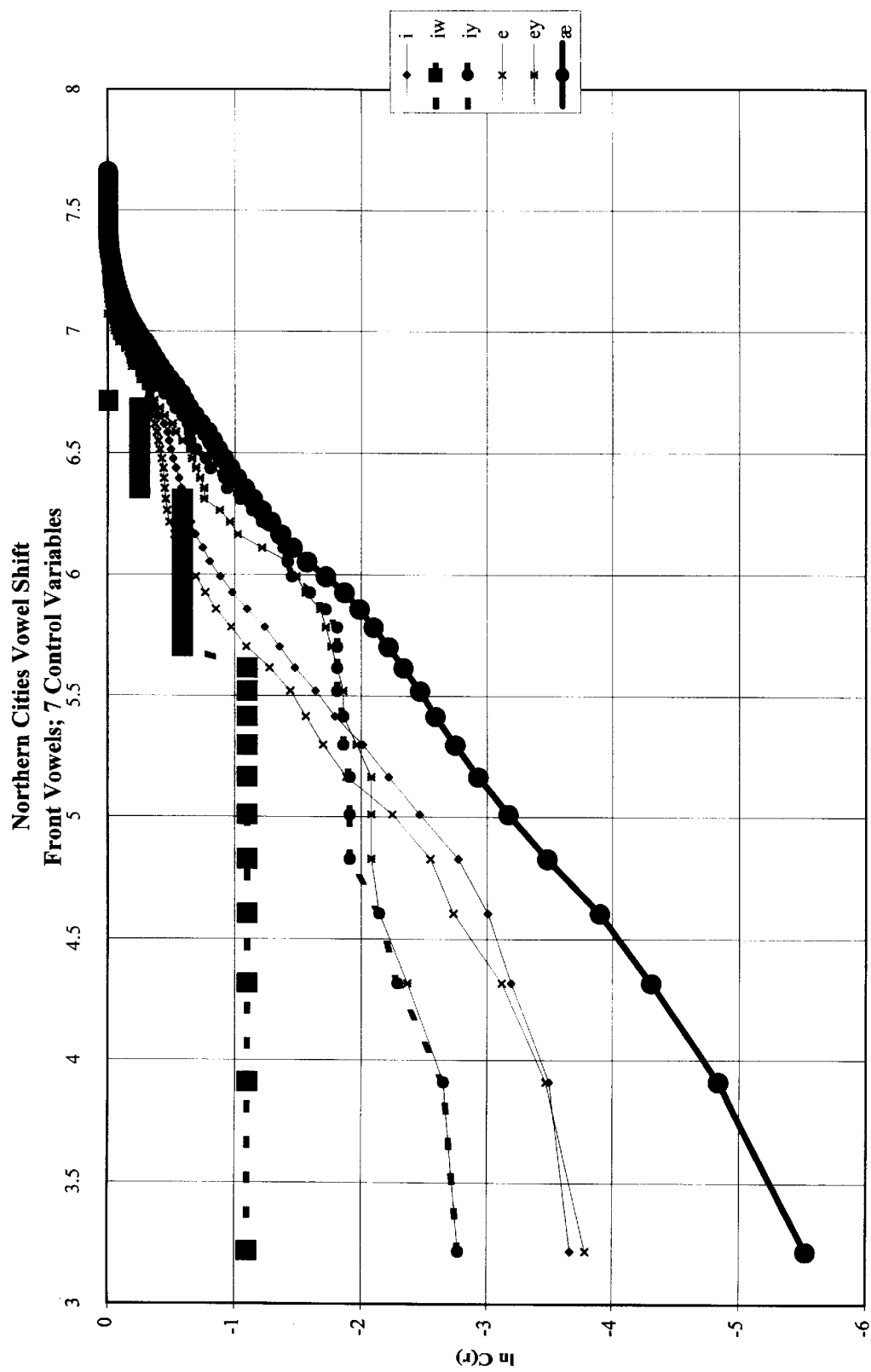
FIG. 6 depicts the front vowels for the participants in the Northern Cities Shift.

FIG. 6 depicts the front vowels for the participants in the Northern Cities Shift. In the figure, the monophthongs, /i/, /e/, and particularly /æ/, show substantial linear segments. These are all participants in the chain shifts revealed in a detailed study of dialect change among the white populations of cities ranging from upstate New York across Minnesota, while the diphthongs generally have not. The diphthong signature on this chart is typical of sounds which are generally stable. The front monophthongs have dimensions ranging from 1.4 to 1.6.

It will now be shown that the structure of these set hierarchies allows the communication and processing of information. To see this, consider phonological attractors, which required several axes apiece to describe them fully, with each projection on each axis with dimension less than one. With fractal attractors, the projection on almost all dimensions in semantic space will in fact be zero. For those dimensions along which the dimension is greater than zero and less than one, it is possible to construct a fractal set, called a cascade, which has the characteristics of a Turing machine.

A simple example of such a cascade, used by Mandelbrot as a simple model for random errors in data transmission, is the Cantor set. This set consists of residues of the unit interval [0,1] from which the middle third is subtracted, and then the operation is applied to each successive residue ad infinitum. The resulting set has dimension s=0.6309 . . . and $H^s(E)=1$.

Instead of this simple set, we can construct a more involved set, which I will call a Gödel cascade, based on a generalized Cantor set. Specifically, we can define a finite union of closed intervals of the unit interval $E_O$, $E_O°E_1°E_2$ . . . For each interval I of $E_j$, we specify $E_{j+1} \cap I$ by selecting an integer m≥2 and letting the subintervals $J_1$, $J_2$, . . . , $J_m$ be equally spaced, with lengths given by $$|J_i|^s = \frac{1}{m}|I|^s$$

Then $$m|J_i|+(m-1)d=|I|(1 \leq i \leq m)$$

where d is the spacing between two consecutive intervals $J_i$. The value for m may vary over different intervals i in $E_j$. The resulting set has dimension s and $H^s(E)=1$.

Now, following Martin Davis in the study of recursive operations and computability, if we associate each of a set of symbols with a different odd integer, we can construct the unique Gödel number for any expression $$r = \prod_{k=1}^{n} Pr(k)^{a_k}$$

where r is the Gödel number, $a_k$ is the integer for the kth symbol and Pr(k) is the kth prime number.

To create a cascade analog to this procedure, if we set m=2 and $$d^{-1}=Pr(k)^{a_k}$$

in the construction of a cascade we can then in principle recover a unique set of residues for any expression by measuring the gaps between the residues. For the expression illustrated in FIG. 7, extended to n symbols, the expression can be recovered in reverse order by comparing the first gap to the residue one level up, the second gap to the residue two levels up, and so on to the $2^n$th gap to the residue n+1 levels up.

This is merely the simplest procedure yielding this result. For equally spaced $J_m$, for example, we can also set w=2m-1 such that $$w=Pr(k)^{a_k}$$

The expression can then be recovered from the ratio between each i and $J_i$ derived from it. Alternatively, if we let m stand for w, the expression would be recoverable by counting the $J_i$. Clearly, since Gödel expressions can model any proposition in any formal system, cascades can, too. Other, more efficient cascades are no doubt possible as well.

A collection of such cascades would be a means to encode a collection of expressions, and hence would constitute a Turing machine.

Since Gödel numbering is not the only means to reduce expressions to integers, this demonstration is only good in principle, but it shows that fractal dimensions make sense. They provide a sufficient (although not necessary) condition for the full gamut of cognitive functions.

The generalized Cantor set from which the Gödel cascade was created is metrically and topologically similar to the "code space" used by Barnsley and his associates for fractal image compression. Barnsley uses code space to reduce the addresses on any attractor in an image to a string of digits, hence its utility in digital image processing.

Asymptotically periodic behavior can clearly be expected from such a system, as we see in real dialect changes. The output of such networks is topologically ordered and characterized by sparse (i.e. efficient) coding, as is also required by networks capable of natural language processing.

The semantic attractor memory architecture and learning algorithm adds structured feedback, which allows correlations without a supervised learning situation, and a non-stationary update rule, which will yield the necessary fractal set components to match observations, since activation patterns in the central processing nodes will produce two dimensional Cantor sets (with fractal dimension less than 2, and generally greater than 1 for high information sets). These sets can then be combined. With a recursive learning algorithm and the processing layers seeking local mutual information maxima, we have the three components necessary for a Turing machine: recursion, composition, and minimalization. Davis also demonstrated that the minimalization operation need be performed only once, which means that the lateral processing layer is sufficient to make the overall architecture function.

It is probably significant to note that PET scans of humans show dimensions generally between 1 and 2, as we would expect from this architecture.

Figure 7:
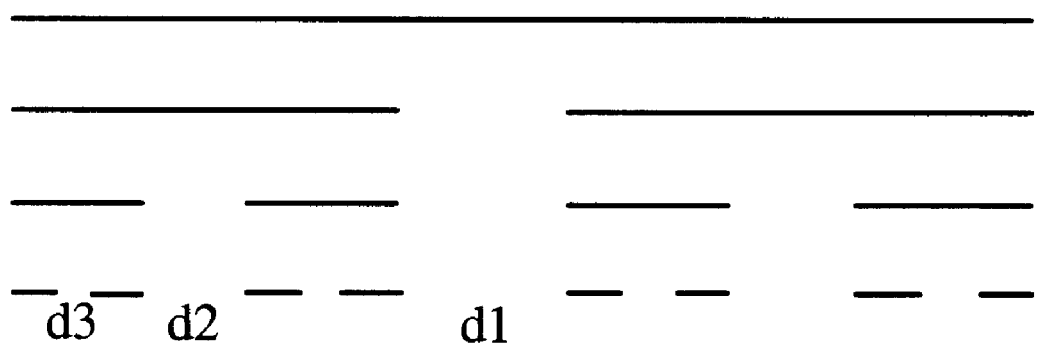
FIG. 7 illustrates the first three iterations in the generation of a Cantor set.

FIG. 7 illustrates the first three iterations in the generation of a Cantor set. Cantor sets are formed by the iterated concentration of the set members into increasingly small subsets of the unit segment [0,1]. In the classical Cantor set, the middle third of the segment is removed at each iteration; that is, the middle third of the segment [0,1], then the middle third of the remaining two pieces, then the middle third of the remaining four pieces, and so on. In a generalized Cantor set, the size of the piece removed is variable. The capability to reconstruct the size of the removed pieces by examination of the residues provides the computational capacity for such sets.

Figure 8:
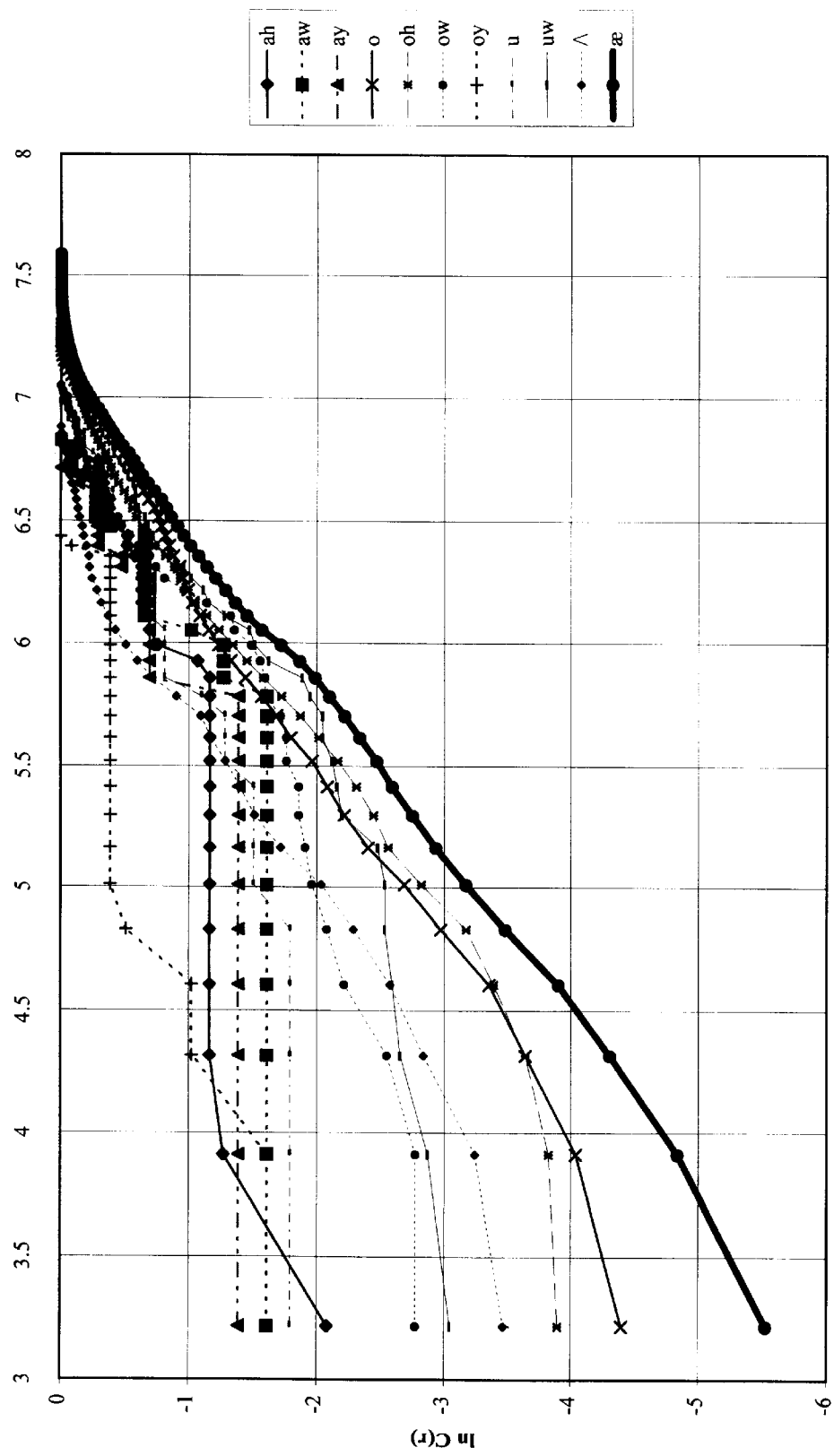
FIGS. 8–10 show graphical illustrations drawn from natural language studies.
Figure 9:
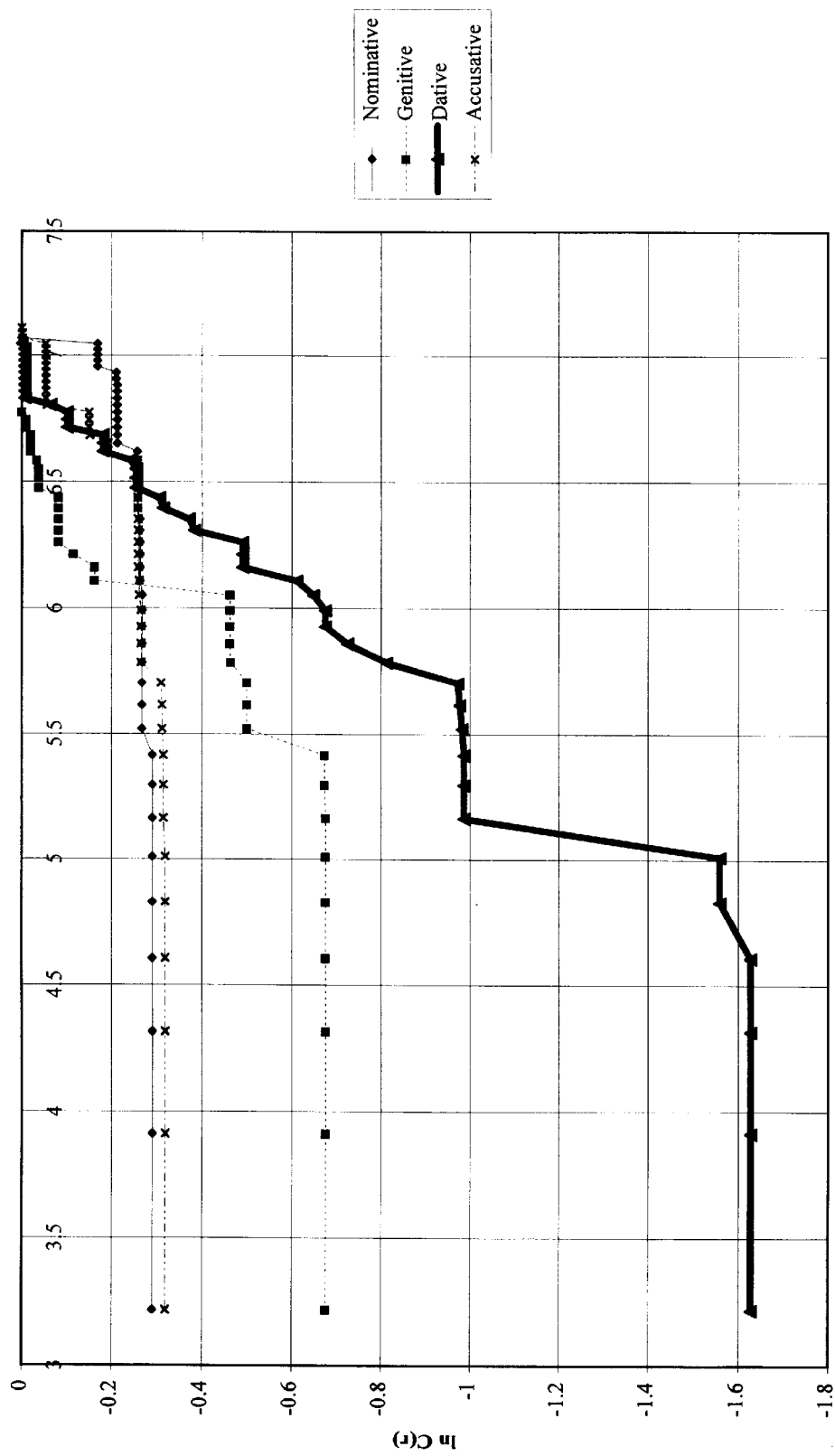
Figure 10:
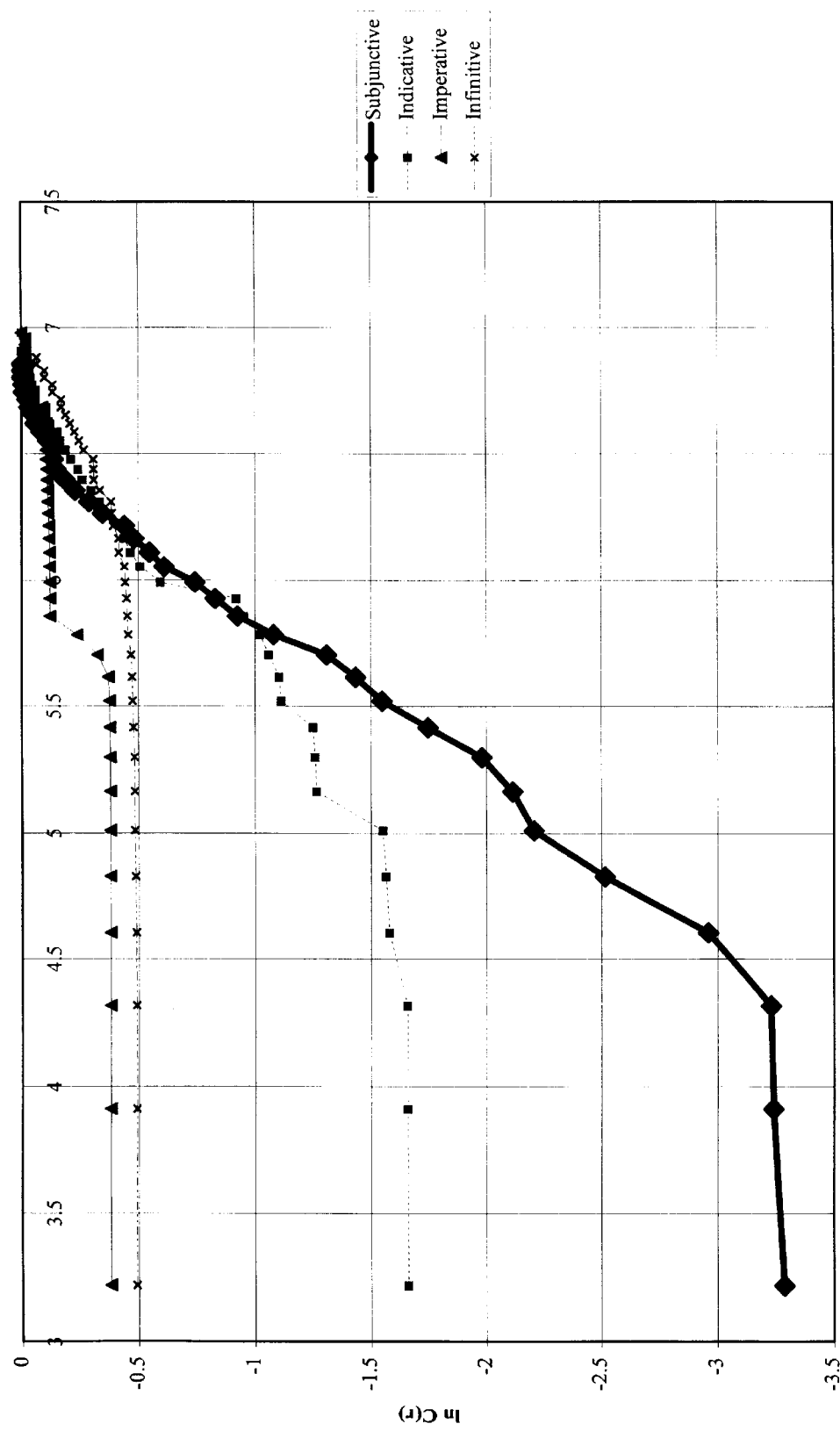

FIGS. 8–10 are drawn from natural language studies, and show similar dimensions at all levels of abstraction. FIG. 8 shows the back vowels from the same Northern Cities Vowel Shift study as FIG. 6; FIG. 9 shows case (i.e., nominative, genitive, dative, accusative) in Old English; and, FIG. 10 shows mood (indicative, subjunctive, imperative, and infinitive) in Old High German. The correlation signatures are all similar, and the underlying dimension is nearly the same as well for the high content sets: approximately 1.2 for the Old English dative, and 1.4 for the Old High German subjunctive.

The present invention can be practiced using digital network emulation software on a general purpose computer, or using special-purpose neural networking hardware, or some combination thereof. As the learning rule depends on probability distributions, digital implementation can calculate the distributions directly, or they can model the process as one of synapse pathway recruitment. In the latter case, since synapses cannot increase without bound, the population of synapses must be renormalized at each step. This is most easily accomplished with a uniform decay rate in the strength of connections.

Similarly, hardware or software/hardware simulations are possible with quantum devices based on particles obeying Bose-Einstein statistics. This population of particles includes photons, and therefore laser devices, but no particles subject to Pauli exclusion, such as electrons.

A preferred implementation of the invention is by means of digital emulation of a network, with the program specifying a series of lattices, each node incorporating the update formula, and each node on a given lattice mapped to nodes on the next lattice by a random, Gaussian distribution. Feedback may similarly require a Gaussian connection between the feedback source and the target processing layer. For single or small numbers of parallel channels, the model can be implemented on a standard intel-based platform, e.g., one having a Pentium processor running at 100 MHz, or on a Macintosh platform with similar computational power. Larger emulations may require a workstation-class computer.

Implementation of the invention is also possible by use of a specialized chip, where the internal circuits respond according to the update rule.

The fact that the network generates Bose-Einstein statistics, and does not need to have them imposed by program, means that hardware implementations are also possible using components exhibiting quantum behaviors, such as lattices of atoms which respond to given frequencies. Bose-Einstein statistics, for example, describe the Einstein radiation mechanism, where the critical parameters are the absorption and spontaneous emission of photons. For this reason, Bose-Einstein statistics underlie physical devices such as lasers, which could thus be adapted to implementation of this type of network.

PROGRAMMING OF THE LEARNING RULES

The learning rules are based on a Polya process, which reinforces success. This is a non-stationary process which induces Bose-Einstein statistics when conducted across large numbers of synapses over many iterations. In the limit, as the iterations approach infinity, the resulting distribution converges to a negative-binomial distribution. The rules themselves may be implemented in three different variants: 1) a basic synapse model; 2) a competitive-learning version focused on neurons rather than synapses; and 3) a hybrid feedforward/back-propagation version in which feedback weights can employ a variety of maximization schemes. The network can run in synchronous mode for all three versions by setting a common clock for the network, with each epoch updated simultaneously across the network. The network can also run in asynchronous mode by setting a non-zero epoch time for each node, but updating weights only for the nodes involved when one fires. Since the asynchronous mode only uses local interactions, some optimization schemes in the hybrid version would not run in this mode.

The rules for the basic synapse model can be programmed as follows:

a. Provide each neuron an address on a two-dimensional layer, similar to cells on a spreadsheet.

b. Specify the connections between each layer, again, similar to specifying connections between cells on multiple spreadsheets in a workbook.

c. For each neuron on layer j, we then have inputs from layer i and outputs to layer k.

d. For each synapse linking i to j:
If i fires, reset the original weight r/s to:

$$\frac{r+c}{s+c} \text{ for excitation}$$

$$\frac{r-c}{s+c} \text{ for inhibition}$$

For threshold $\theta_j$ for the neuron, when $$\sum_i w_{ji} \geq \theta_j$$

j fires
e. Calculate for all neurons on level j.
f. Repeat calculations for all neurons on level k.
g. Initial inputs to the first layer are measurements from the environment (signals from light sensors, low/high pass filters from sound equipment, etc.).
h. Final outputs are to devices connected to the environment (printers, muscles, speakers, etc.)

The rules for competitive learning are similar, but modified as follows:
a. Lateral connections (i.e., within the same layer) between neurons are specified as inhibitory.
b. Step d above is modified as follows:
If i fires, and if j fires, i.e., when $$\sum_i w_{ji} \geq \theta_j$$

Then reset r/s as above.

In these rules, the feedback loops in the architecture are treated identically to the pathways from input to output. To employ alternate backpropagation maximization schemes, however, such as Linsker's "infomax," the feedback loops can be treated differently, with the weights reset according to the maximization scheme. This makes the network a hybrid feedforward/backpropagation network. This approach is more expensive in memory, but potentially faster.

To model "forgetting," which avoids saturation of the synaptic weights, any of these versions can be modified by introducing a decay factor. Since the decay factor is not related to activity, but simply to time, any synaptic junction that is inactive will eventually approach a connectivity of zero, for any non-zero decay rate. Decay at a synapse can then be modeled by:

$$w_{ji}(t) = \frac{r + \alpha - \beta}{s + \eta + \delta(t)}$$

for $\alpha + \beta = \eta$ all positive; $\delta(t) \geq 0$ monotone increasing where $\alpha$ is the number of excitations, and $\beta$ is the number of inhibitions.

Other decay rates are possible. For example, the common form $$w_{ji}(t) = \frac{r + \alpha - \beta}{s + \eta} - \delta(t); \delta(t) \geq 0$$

e.g. $\delta(t) = e^{-kt}\left(\frac{r + \alpha - \beta}{s + \eta}\right)$

PROGRAMMING THE ARCHITECTURE

The architecture has three components: 1) an input component; 2) a processing component; and 3) an output component. It therefore has a minimum of three layers. When there are more than three layers, the components overlap. That is, the last input layer is also the first processing layer. Similarly, the last processing layer is also the first output layer.

The input component consists of one or more feedforward layers. The first layer takes its input from measurements of the environment as described above.

The processing layer consists of three or more layers. At least the middle layer has lateral connectivity within a given channel, and to other channels. Lateral connectivity within other layers of this component can be specified as desired. The layers also have internal feedback as indicated in the diagrams. Output feedback feeds to the first processing layer.

The output component has one or more feedforward layers, with final output to the environment as described above. Feedback from the final output goes to the first processing layer.

The architecture must have a channelized structure because the underlying Polya process converges to a stationary distribution as the number of actions goes to infinity. Hence the learning characteristics are maximized when the number of elements in each layer in a channel is the minimum necessary to process the data.

The "leaky" processing feature of the network can be induced by allowing random connections outside a given channel when the signal passes up the layers. This can be accomplished, for example, by employing a gaussian distribution so that connections from one layer to the next are scattered around a mean corresponding to a direct vertical connection. The variance of the gaussian distribution would determine how "leaky" the channel was.

Learning characteristics of the network are also affected by how channels are interconnected. If related data is processed in adjacent channels in the network, it would find the correlation much more quickly than if the channels were widely separated.

Consequently, the learning characteristics of the network are crucially linked to the size and interconnections of the channels. This is particularly so due to the simple nature of the learning rules.

Figure 1A:
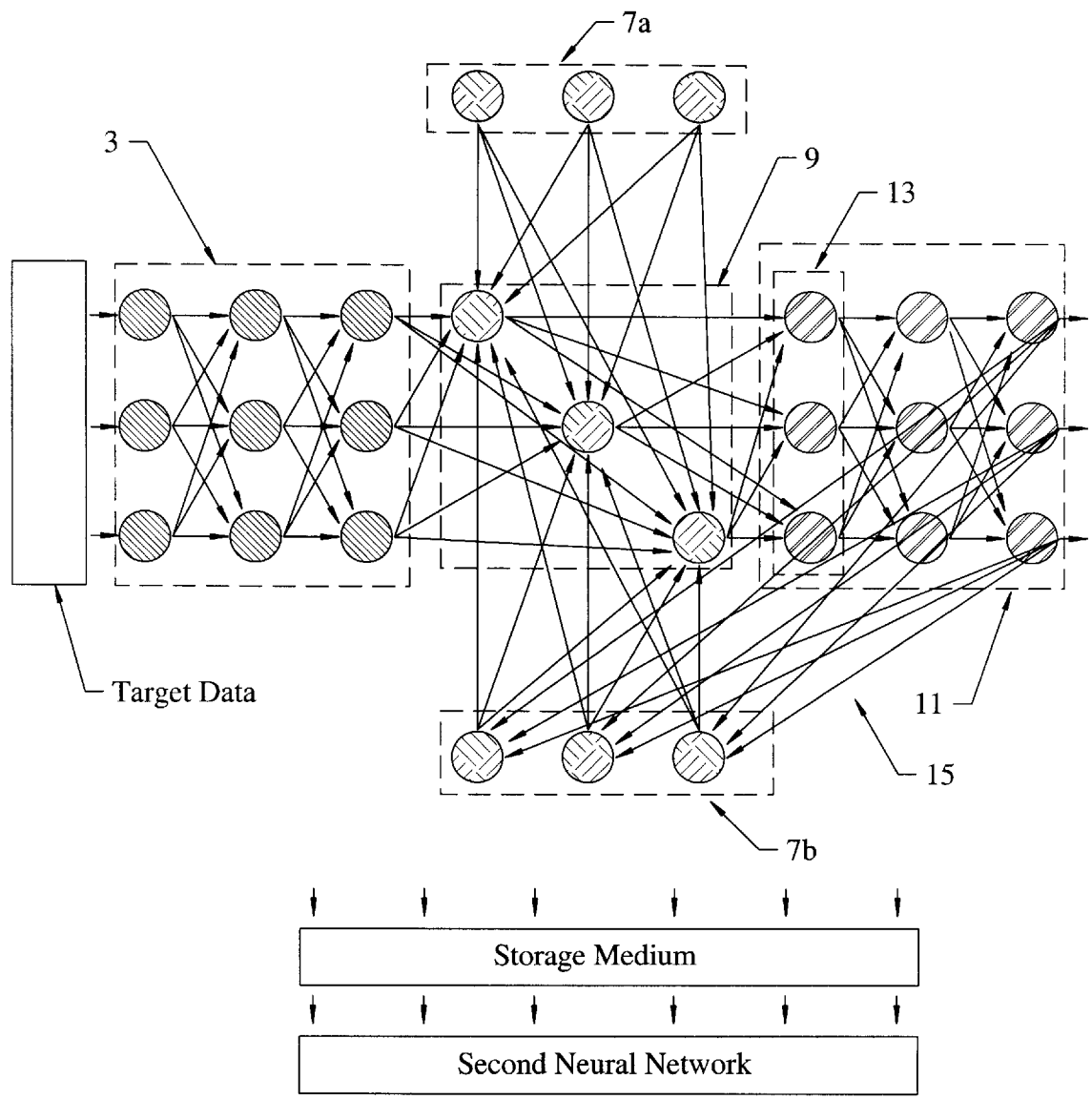
FIG. 1a illustrates a diagramatic view of the semantic attractor memory architecture of the invention according to an embodiment wherein the invention is used to program a second neural network.

The attractor concept underlying this design is also important because, as illustrated in FIG. 1a, successful combinations of weights and channels can be recorded and programmed in other networks as, for example, pattern classifiers or processors, so that the new networks need not be trained for that capability. In this way, recorded attractors can be used as a programming language for feedforward or hybrid neural networks. Specialized circuits or chips can also model the attractors.

While the invention has been particularly shown and described with reference to a preferred embodiment thereof it will be understood by those skilled in the art that various changes in form and details may be made therein without departing from the spirit and scope of the invention.

The embodiments of the invention in which an exclusive property or privilege is claimed are defined as follows:

1. A method for processing information ti an unsupervised manner, comprising:
using a feedforward neural network having a plurality of parallel multiple-layer channels, each comprising a multiple-layered set of nodes, with random connections from one layer to the next, to transform input arrays from prior layers or the environment into output arrays with fractal dimension for subsequent layers or output devices;
using at least one layer of said multiple-layer channels to process input information;
using a plurality of processing layers to process inputs from a plurality of said parallel multiple-layer channels;

feeding back information from at least one of said plurality of processing layers to a prior one of said processing layers;

using at least one output layer in an output channel of said plurality of multiple-layer channels to process outputs;

feeding back information from said at least one output channel back to said at least one processing layer;

using lateral connections from said parallel channels as inputs to said at least one processing layer; and, applying selective excitation and inhibition to nodes of said channels and using said nodes to apply learning rules which are based upon non-stationary statistical processes to inputs of said channels to create constellations of activations having fractal dimension.

2. The method according to claim 1, wherein said non-stationary statistical processes comprise a Polya process.

3. The method according to claim 1, wherein said non-stationary statistical processes comprise a process which employs Bose-Einstein statistics.

4. A neural network system for processing information in an unsupervised manner, comprising:

a feedforward architecture having a plurality of channel means, each comprising a plurality of layers of nodes with random connections from one layer to the next, for transforming input arrays from prior layers or the environment into output arrays having fractal dimension for subsequent layers or output devices, said plurality of channels further comprising:

at least one input layer means devoted to processing input information;

a plurality of processing layer means;

at least one feedback connection from one of said processing layer means to a prior one of said processing layer means;

at least one output layer means, in an output channel means of said plurality of channels, devoted to processing outputs;

means for providing feedback from said at least one output channel means back to said at least one processing layer means;

inputs from parallel channels to said at least one processing layer means; and, said channel means comprising means for applying selective excitation and inhibition to nodes and means for applying learning rules which are based upon non-stationary statistical processes to inputs of said channel means to create constellations of activations having fractal dimension.

5. The neural network system according to claim 4, wherein said non-stationary statistical process comprises a Polya process.

6. The neural network system according to claim 4, wherein said non-stationary statistical process comprises a process which employs Bose-Einstein statistics.

7. A neural network system for processing information in an unsupervised manner, comprising:

a feedforward architecture having a plurality of self-adjusting variable-width multiple-layer channel means, each comprising a multiple-layered set of nodes, for transforming input arrays from prior layers or the environment into output arrays of fractal dimension for subsequent layers or output devices, with random connections from one layer to the next;

at least one input layer means devoted to processing input information;

a plurality of processing layer means;

feedback connections from at least one of said processing layer means back to a prior processing layer means;

at least one output layer means, within an output channel means, devoted to processing outputs;

means for providing feedback from said at least one output channel means back to at least one of said plurality of processing layer means; and, inputs from parallel channels to said at least one processing layer means.

8. A method for processing information in an unsupervised manner, comprising the steps of:

using a feedforward neural network having a plurality of parallel multiple-layer channels, each comprising a multiple-layered set of nodes, with random connections from one layer to the next, to transform input arrays from prior layers or the environment into output arrays of fractal dimension for subsequent layers or output devices; and, applying selective excitation and inhibition to nodes of said channels and using said nodes to apply, to inputs of said channels, learning rules which are based upon non-stationary statistical processes, whereby constellations of activations having fractal dimension are created.

9. The method according to claim 8, wherein said non-stationary statistical process comprises a Polya process.

10. The method according to claim 8, wherein said non-stationary statistical process comprises a process which employs Bose-Einstein statistics.

11. A process for using a first neural network to program a second neural network, comprising:

using a plurality of parallel multiple-layer channels, each comprising a multiple-layered set of nodes, to transform input arrays from prior layers or the environment into output arrays of fractal dimension;

using at least one input layer to process inputs;

using outputs from at least one of said plurality of parallel multiple-layer channels as inputs to at least one processing layer having lateral connections;

using at least one output layer to process outputs;

using feedback connections to connect said at least one output layer and said at least one processing layer;

assigning connection weights to said feedback connections and said lateral connections;

providing target data to said input layers;

adjusting said connection weights;

varying said feedback connections and said lateral connections;

applying selective excitation and inhibition to nodes of said channels and using said nodes to apply learning rules which are based upon non-stationary statistical processes to inputs of said channels to create constellations of activations having fractal dimension;

recording at least one successful combination of connection weights, feedback connections, and lateral connections, which together comprise a set having fractal dimension; and, using said at least one successful combination to program a second neural network.

12. The method according to claim 11, wherein said successful combination comprises a feedforward combination.

13. The method according to claim 11, wherein said step of using said successful combination comprises using said successful combination to program a pattern classifier.

14. The method according to claim 11, wherein said step of using said successful combination comprises using said successful combination to program a microprocessor.

15. A system for using a first neural network to program a second neural network, comprising:

a first neural network, further comprising:

a plurality of multiple-layer channels, each comprising a multiple-layered set of nodes, for transforming input arrays from prior layers or the environment to output arrays of fractal dimension for subsequent layers or output devices;

at least one input layer;

at least one processing layer having lateral connections;

at least one output layer in at least one output channel;

feedback connections between said at least one output channel and said at least one processing layer;

means for assigning connection weights to said feedback connections and said lateral connections;

means for providing target data to said input layers;

means for evolving said connection weights;

means for varying said feedback connections and said lateral connections;

means for applying selective excitation and inhibition to nodes of said channels and using said nodes to apply learning rules which are based upon non-stationary statistical processes to inputs of said channels to create constellations of activations having fractal dimension;

means for recording at least one set of fractal dimension, said set comprising a successful combination of connection weights, feedback connections, and lateral connections; and, means for using said at least one successful combination to program a second neural network.

16. The system according to claim 15, wherein said second neural network comprises a pattern classifier.

17. The system according to claim 15, wherein said second neural network comprises a microprocessor.

18. The system according to claim 15, wherein said second neural network is complex relative to said first neural network, and wherein said at least one successful combination is used to program at least one capability among a larger set of capabilities for which said second neural network is programmed.

19. The system according to claim 15, wherein said at least one successful combination comprises a cascade.

20. A method for processing information, comprising:

using a feedforward neural network system to process said information in an unsupervised manner, further comprising the steps of:

providing a plurality of multiple-layer channels, each comprising a multiple-layered set of nodes, for transforming input arrays from prior layers or the environment to output arrays of fractal dimension for subsequent layers or output devices;

using at least one layer to process input information;

using at least one processing layer to process outputs of said input layer;

using at least one output layer in at least one output channel to process outputs;

feeding back data from said at least one output channel back to said at least one processing layer;

using outputs from parallel channels as inputs to said at least one processing layer; and, applying selective excitation and inhibition to nodes of said channels and using said nodes to apply learning rules which are based upon non-stationary statistical processes to inputs of said channel means to create constellations of activations with fractal dimensions.

* * * * *